2,888,416
NEW PIGMENTS

Ronald Bertram Giness and Harry James Twitchett, Manchester, England, assignors to Imperial Chemical Industries Limited, London, England, a corporation of Great Britain No Drawing. Application June 27, 1955
Serial No. 518,368

Claims priority, application Great Britain July 2, 1954

12 Claims. (Cl. 260—16)

This invention relates to new pigments and more particularly it relates to new maroon azo pigments which are especially useful in the manufacture of lacquers.

Maroon azo pigments which are available for use in the colouring of nitrocellulose or synthetic resin lacquers possess certain disadvantages. Azo pigments for example monoazo compounds devoid of groups conferring solubility in water possess the necessary degree of light fastness but they are generally too soluble in the organic solvents used as lacquer medium and are consequently not wholly satisfactory for use in the manufacture of lacquers since such solubility prevents the satisfactory application of white overstripes and other decorative effects, while in some instances, the solubility of the pigment leads to "blooming" of the films obtained when the lacquers are used. Other azo pigments for example metallic salts of azo dyestuffs containing sulphonic or carboxylic acid groups possess the necessary degree of insolubility in the organic solvent media but they are insufficiently fast to light and are thus not wholly satisfactory in the manufacture of lacquers. Moreover, pigments are frequently incorporated with metallic powders, for example aluminium powder, into lacquers to produce desirable polychromatic finishes and many of the known maroon pigments, when so used, show a greately increased tendency to fade when exposed to light.

We have now found that these disadvantages may be obviated by the new azo pigments of our invention which when incorporated into nitrocellulose lacquer media or mixtures of nitrocellulose and synthetic resin lacquer media and also when used in the presence of metallic powders, for example aluminium powder, possess good stability in these lacquer media and show no colour change on storage over a period of time.

According to our invention therefore we provide new azo pigments which are the manganese salts of those chromium complexes of 1-(5'-chloro-2'-carboxyphenylazo)-2-hydroxynaphthalene-3- carboxylic acid which contain between 0.4 and 0.6 atom of chromium to one molecule of the monoazo compounds.

The preferred manganese salt of the chromium complex of our invention is one which contains 0.5 atom of chromium to one molecule of the monoazo compound, namely the manganese salt of the chromium complex of the formula:

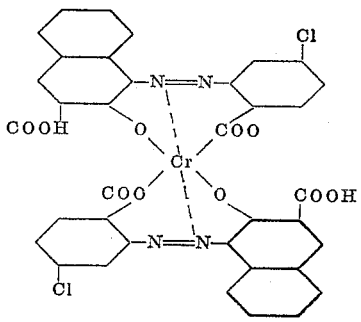

and it may be supposed that the complexes containing between 0.4 and 0.6 atom of chromium consist principally of this compound.

According to a further feature of the invention we provide new compositions of matter which are lacquers or coating compositions containing the said new pigments.

According to a still further feature of our invention we provide a process for the manufacture of the said new azo pigments which comprises reacting a chromium complex of 1-(5'-chloro-2'-carboxyphenylazo)-2-hydroxynaphthalene-3-carboxylic acid which contains between 0.4 and 0.6 atom of chromium to one molecule of the monoazo compound with a manganese salt.

The said 1-(5'-chloro-2'-carboxyphenylazo)-2-hydroxynaphthalene-3-carboxylic acid may be obtained by coupling diazotised 4-chloro-2-aminobenzoic acid with 2:3-hydroxynaphthoic acid in an alkaline medium for example an aqueous medium containing sodium carbonate or sodium hydroxide.

Chromium complexes of 1-(5'-chloro-2'-carboxyphenylazo)-2-hydroxynaphthalene - 3 - carboxylic acid which contain between 0.4 and 0.6 atom of chromium to one molecule of the monoazo compound may be obtained from 1-(5'-chloro-2'-carboxyphenylazo)-2-hydroxynaphthalene-3-carboxylic acid by any of the conventional chroming processes known to the art and may conveniently be obtained, if desired, by treatment of the said monoazo compound with a solution of a chromium salt for example the acetate or the formate.

The manganese salt used in this process may be for example manganese chloride or manganese sulphate.

The new azo pigment of our invention possess good light fastness and the necessary degree of insolubility in organic solvents to make it especially useful in the manufacture of stable maroon coloured lacquers and it is also particularly useful in the manufacture of stable coloured lacquers which contain in addition metallic powders for example aluminum powder. Moreover the new pigment possesses a yellower undertone than other maroon pigments commonly used and this is particularly advantageous in the production of desirable polychromatic finishes which are more pleasing and attractive than those obtained from known maroon pigments with bluer shades of undertone. The particular combination of undertone shade and fastness properties possessed by our new pigment is not otherwise obtainable by any known means.

The lacquers containing the new azo pigments of the invention may be formulated with cellulose derivatives for example nitrocellulose or with synthetic resins or with mixtures of cellulose derivatives and synthetic resins and they may contain other inert solvents or diluents for example dibutylphthalate, xylene, toluene, ethylacetate, butylacetate and butyl alcohol. The lacquers may be obtained in any known manner for example by compounding, grinding or otherwise mixing the composition in a conventional ball or other type mill until dispersion of the pigment in the medium is complete.

These lacquers may be used for example as coating compositions to produce coloured surface films possessing a high degree of durability and colour stability on exposure to weathering.

The lacquers or coating compositions may be used to obtain durable finishes for motor vehicles, public transport vehicles and the like and they also have industrial applications of many kinds.

The invention is illustrated but not limited by the following examples in which the parts are by weight:

Example 1

7 parts of sodium nitrite are added to a solution of 17.2 parts of 4-chloro-2-aminobenzoic acid in 350 parts of water containing 4.4 parts of sodium hydroxide and the solution is cooled to 0° C. and stirred rapidly. 21 parts of concentrated aqueous hydrochloric acid are then added and the solution is filtered. The filtrate is added during 30 minutes to a solution, at 10° C., of 19 parts of 2:3-hydroxynaphthoic acid in 600 parts of water containing 12 parts of sodium hydroxide. The suspension is stirred for 2 hours and filtered and the solid residue is then suspended in 1,000 parts of water at 55° C. This suspension is added during 15 minutes to a solution of 8.75 parts of chromium formate (27.8% Cr) in 250 parts of water at 95° C. and the suspension is boiled for 2 hours. A solution of 30 parts manganous chloride ($MnCl_2.4H_2O$) in 150 parts of water is then added and the suspension then boiled for a further 1½ hours. The reaction mixture is then filtered, the solid residue washed with 1500 parts of water and dried.

*Example 2*

The pigment obtained in Example 1 was used to obtain a maroon lacquer of the following composition:

| | Parts |
|---|---|
| Maroon pigment of Example 1 | 2.90 |
| Nitrocellulose | 14.94 |
| Oil modified alkyd resin | 7.47 |
| Dibutyl phthalate | 7.47 |
| Xylene | 16.80 |
| Toluene | 16.80 |
| Ethyl acetate | 16.80 |
| Butyl acetate | 10.10 |
| Butyl alcohol | 6.72 |
| | 100.00 | by ball-milling the nitrocellulose-resin-plasticiser solutions with the pigment. This lacquer is stable to storage and gives deep maroon full shades of good film durability and fastness to light. The film surfaces show no tendency to "bloom" and white overstripes or other decorative effects may be applied to them without undesirable bleeding effects.

*Example 3*

The pigment obtained in Example 1 was used to obtain a lacquer as follows:

| Aluminium lacquer: | Parts |
|---|---|
| 30% Aluminium paste | 5.00 |
| Nitrocellulose | 14.63 |
| Oil modified alkyd resin | 7.32 |
| Dibutyl phthalate | 7.32 |
| Xylene | 16.43 |
| Toluene | 16.43 |
| Ethyl acetate | 16.43 |
| Butyl acetate | 9.86 |
| Butyl alcohol | 6.58 |
| | 100.00 |

The above aluminium lacquer was obtained by stirring the aluminium paste with the nitrocellulose-resin-plasticiser solution for 1 hour at 20–25° C. The final composition was obtained by mixing 65 parts of this aluminium lacquer with 35 parts of the maroon lacquer obtained as described in Example 2.

This lacquer comprising aluminium and maroon pigments affords a finish of good durability and fastness to light and the effects obtained are more attractive than those obtained by using known maroon pigments possessing bluer shades of reduction.

What we claim is:

1. Azo pigments which are the manganese salts of those chromium complexes of 1-(5'-chloro-2'-carboxyphenylazo)-2-hydroxynaphthalene-3-carboxylic acid which contain between 0.4 and 0.6 atom of chromium to one molecule of the monoazo compounds.

2. The azo pigment which is the manganese salt of the chromium complex of 1-(5'-chloro-2'-carboxyphenylazo)-2-hydroxynaphthalene-3-carboxylic acid which contains 0.5 atom of chromium to one molecule of the monoazo compound.

3. Process for the manufacture of azo pigments as claimed in claim 1 which comprises reacting a chromium complex of 1-(5'-chloro-2'-carboxyphenylazo)-2-hydroxynaphthalene-3-carboxylic acid which contains between 0.4 and 0.6 atom of chromium to one molecule of the monoazo compound with a manganese salt.

4. Process as claimed in claim 3 wherein the manganese salt is selected from the group consisting of manganese chloride and manganese sulphate.

5. A coating composition comprising an azo pigment as defined in claim 1, an inert liquid vehicle therefor and at least one metallic powder.

6. A coating composition as claimed in claim 5 wherein the metallic powder is aluminium powder.

7. A coating composition as claimed in claim 5 wherein there is present at least one cellulose derivative.

8. A coating composition as claimed in claim 5 wherein there is present at least one synthetic resin.

9. A coating composition as claimed in claim 5 wherein there is present at least one cellulose derivative and at least one synthetic resin.

10. A coating composition as claimed in claim 7 wherein the cellulose derivative is nitrocellulose.

11. A coating composition as claimed in claim 8 wherein the synthetic resin is an oil modified alkyd resin.

12. A coating composition as claimed in claim 5 wherein said inert liquid vehicle is selected from the group consisting of dibutylphthalate, xylene, toluene, ethylacetate, butyl acetate and butyl alcohol.

References Cited in the file of this patent

UNITED STATES PATENTS

| 2,090,432 | Straub et al. | Aug. 17, 1937 |
| 2,649,383 | Killian et al. | Aug. 18, 1953 |